United States Patent
Kang et al.

(10) Patent No.: US 8,013,496 B2
(45) Date of Patent: Sep. 6, 2011

(54) PIEZO ELECTRIC LINEAR MOTOR

(75) Inventors: Chong Yun Kang, Seoul (KR); Seok Jin Yoon, Seoul (KR); Dae Yong Jeong, Seoul (KR); Hyun Jai Kim, Seoul (KR); Piotr Vasiljev, Vilnius (LT); Ji Won Choi, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 68 days.

(21) Appl. No.: 12/300,917

(22) PCT Filed: Dec. 8, 2006

(86) PCT No.: PCT/KR2006/005350
§ 371 (c)(1),
(2), (4) Date: Nov. 14, 2008

(87) PCT Pub. No.: WO2008/050932
PCT Pub. Date: May 2, 2008

(65) Prior Publication Data
US 2009/0251026 A1    Oct. 8, 2009

(30) Foreign Application Priority Data
Oct. 24, 2006  (KR) .................. 10-2006-0103210

(51) Int. Cl.
*H02N 2/08* (2006.01)
(52) U.S. Cl. ......... 310/323.16; 310/323.02; 310/323.12; 310/328
(58) Field of Classification Search ............. 310/323.16, 310/323.12, 323.02, 328
See application file for complete search history.

(56) References Cited

U.S. PATENT DOCUMENTS

| | | | | |
|---|---|---|---|---|
| 6,747,394 | B2 * | 6/2004 | Johansson et al. | 310/323.02 |
| 6,831,393 | B2 * | 12/2004 | Miyazawa | 310/323.14 |
| 6,979,934 | B1 * | 12/2005 | Wischnewskiy | 310/323.01 |
| 6,984,920 | B2 | 1/2006 | Yoon et al. | |
| 7,061,158 | B2 * | 6/2006 | Ganor | 310/317 |
| 7,116,038 | B2 * | 10/2006 | Miyazawa et al. | 310/323.02 |
| 7,211,929 | B2 * | 5/2007 | Ganor et al. | 310/317 |
| 2001/0011860 | A1 * | 8/2001 | Dettmann et al. | 310/323.16 |
| 2003/0178915 | A1 * | 9/2003 | Yoon et al. | 310/323.01 |
| 2004/0256954 | A1 * | 12/2004 | Magnussen et al. | 310/328 |

FOREIGN PATENT DOCUMENTS

| | | |
|---|---|---|
| KR | 10-2004-0027753 | 4/2004 |
| KR | 10-2004-0092005 | 11/2004 |
| WO | WO 2005/083874 | 9/2005 |

* cited by examiner

*Primary Examiner* — Walter Benson
*Assistant Examiner* — Bryan P Gordon
(74) *Attorney, Agent, or Firm* — Ladas & Parry LLP

(57) ABSTRACT

The present invention relates to a piezoelectric linear motor that can make relatively low abrasion and accurate linear movement since stationary AC voltages are applied to two piezoelectric elements with a phase difference. The present invention provides a piezoelectric linear motor, comprising: a piezoelectric substrate having a first piezoelectric element and a second piezoelectric element, wherein AC voltages are applied to the first and second piezoelectric elements with a phase difference; a metallic elastic body having first and second elastic bodies coupled to the piezoelectric elements and a central protrusion protruded at the central portion connecting the first and second elastic bodies, wherein the central protrusion oscillates elliptically during an application of the voltage; and a mover brought into contact with the central protrusion of the metallic elastic body for a linear movement, and wherein the movement of the mover is orthogonal to the central protrusion.

20 Claims, 8 Drawing Sheets

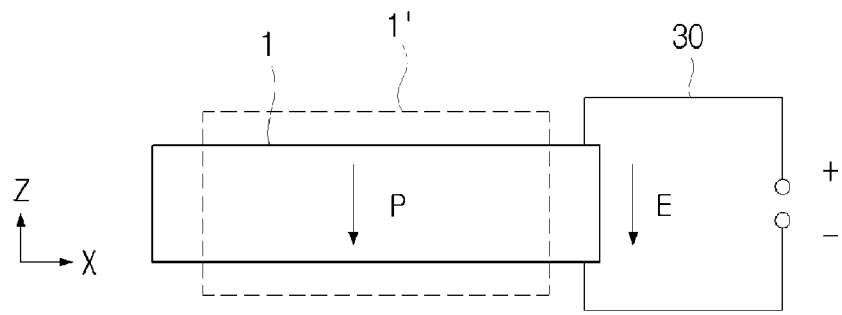
[Fig. 1]
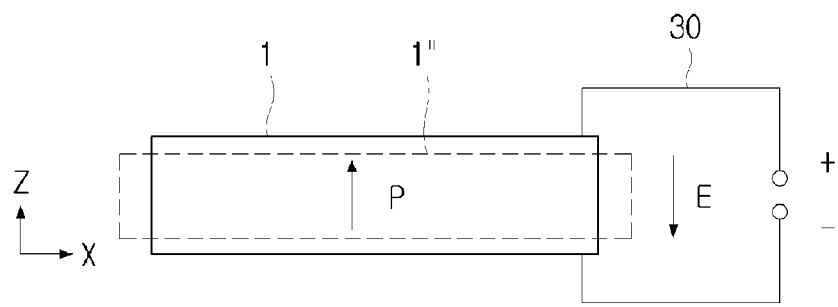
[Fig. 2]
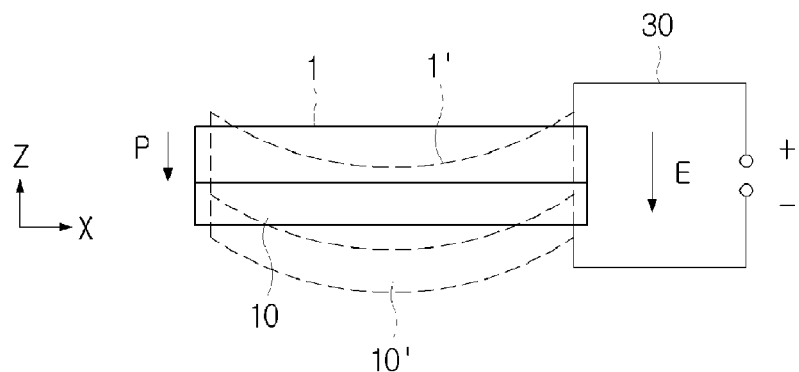
[Fig. 3]
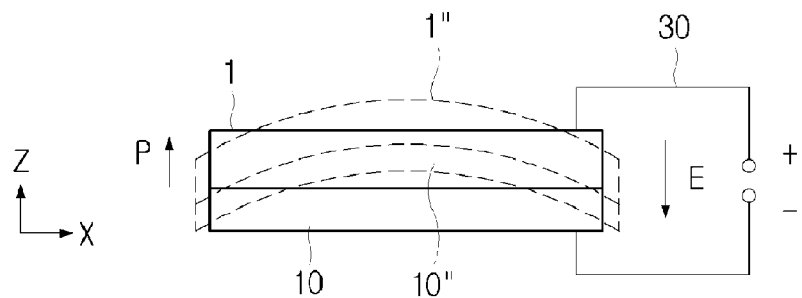
[Fig. 4]

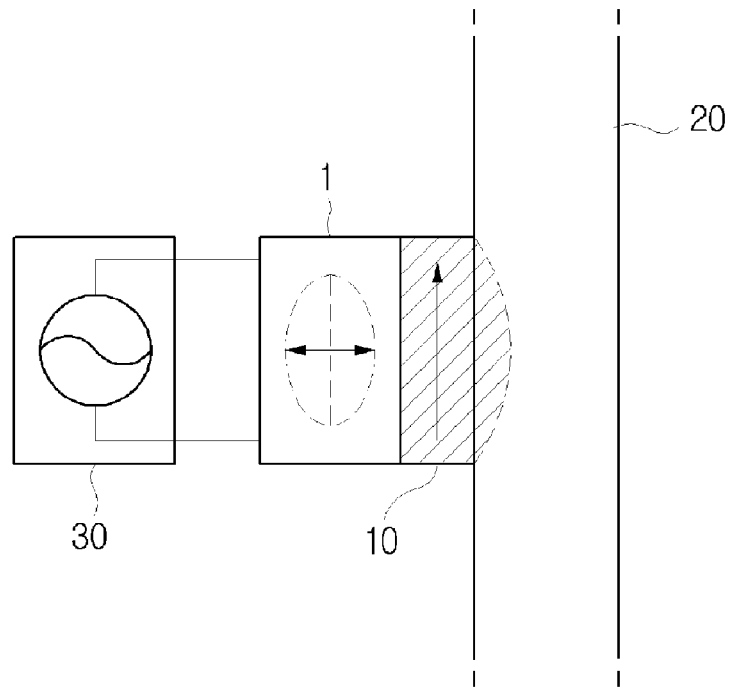
[Fig. 5]
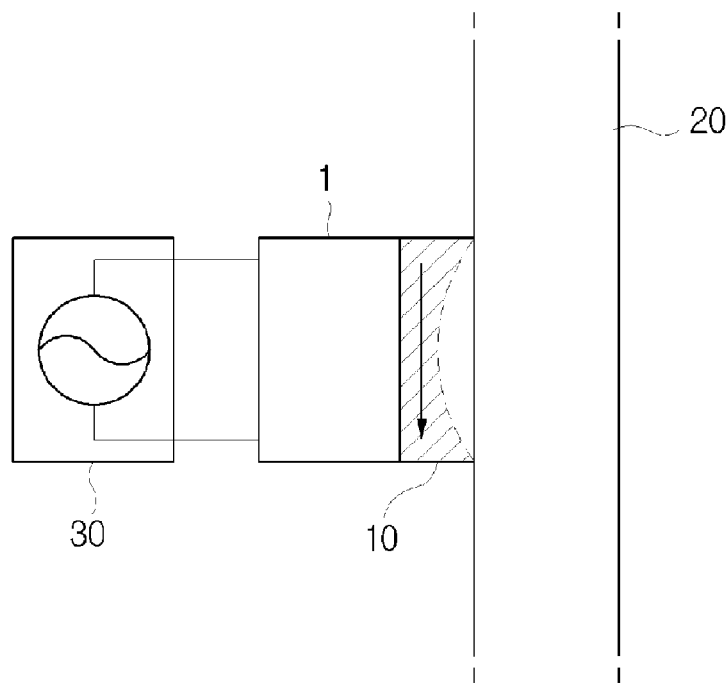
[Fig. 6]

[Fig. 7]
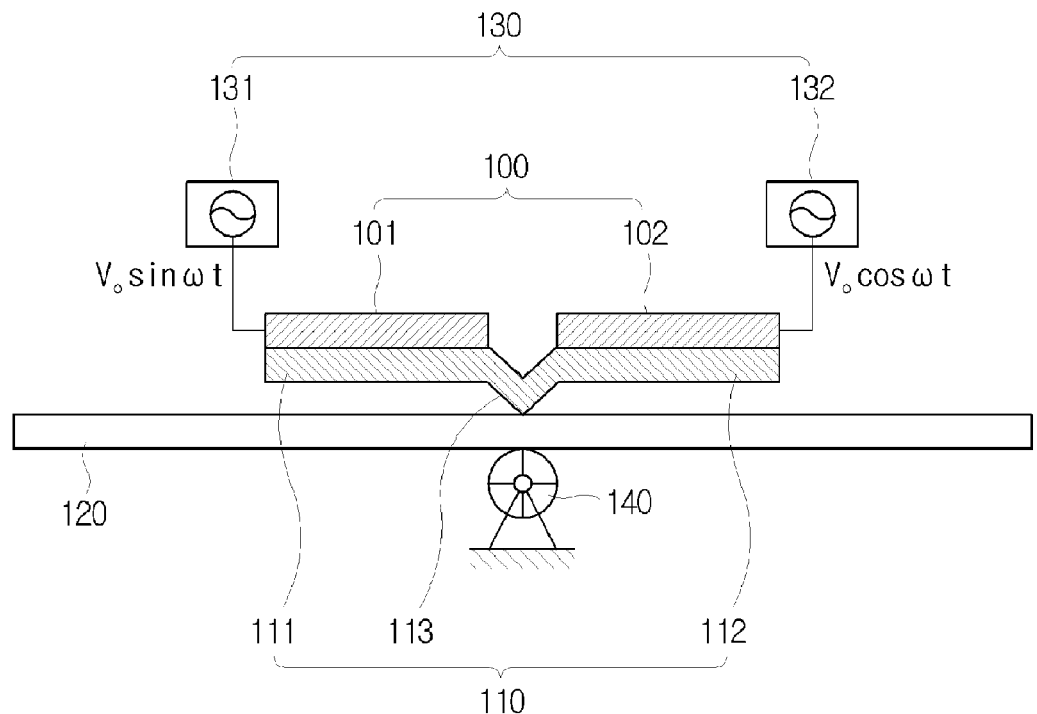
[Fig. 8]
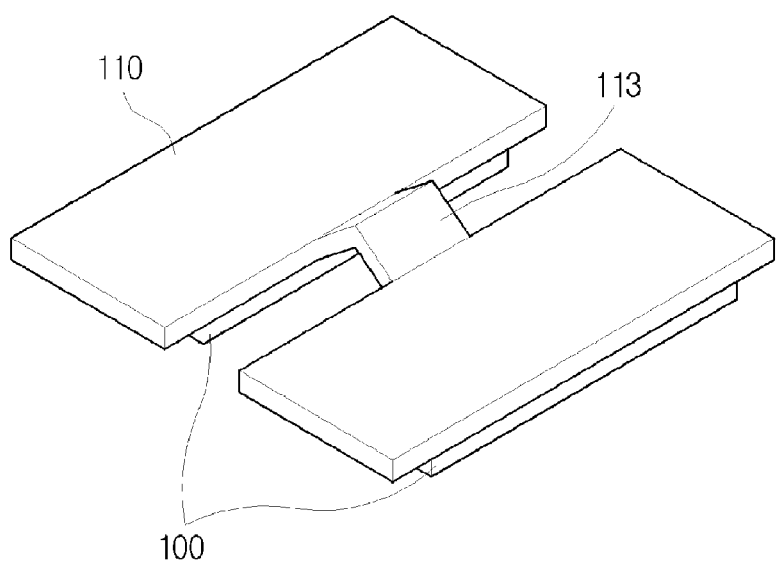

[Fig. 9]
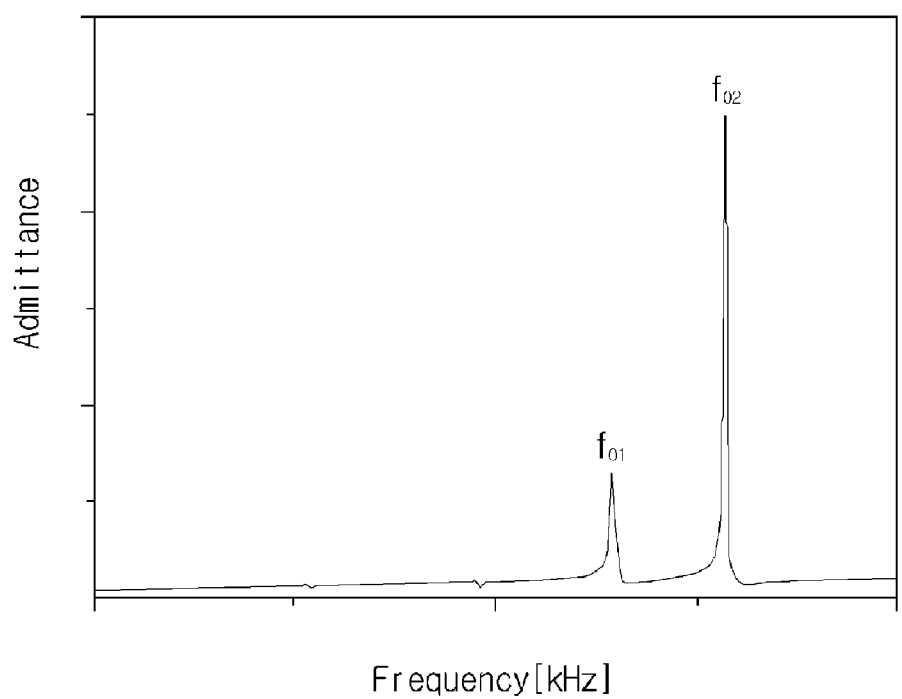
[Fig. 10]
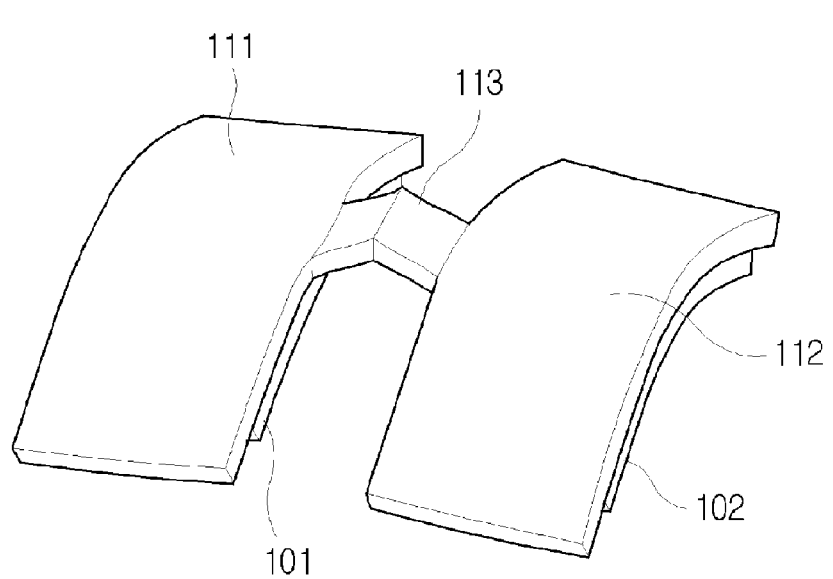

[Fig. 11]
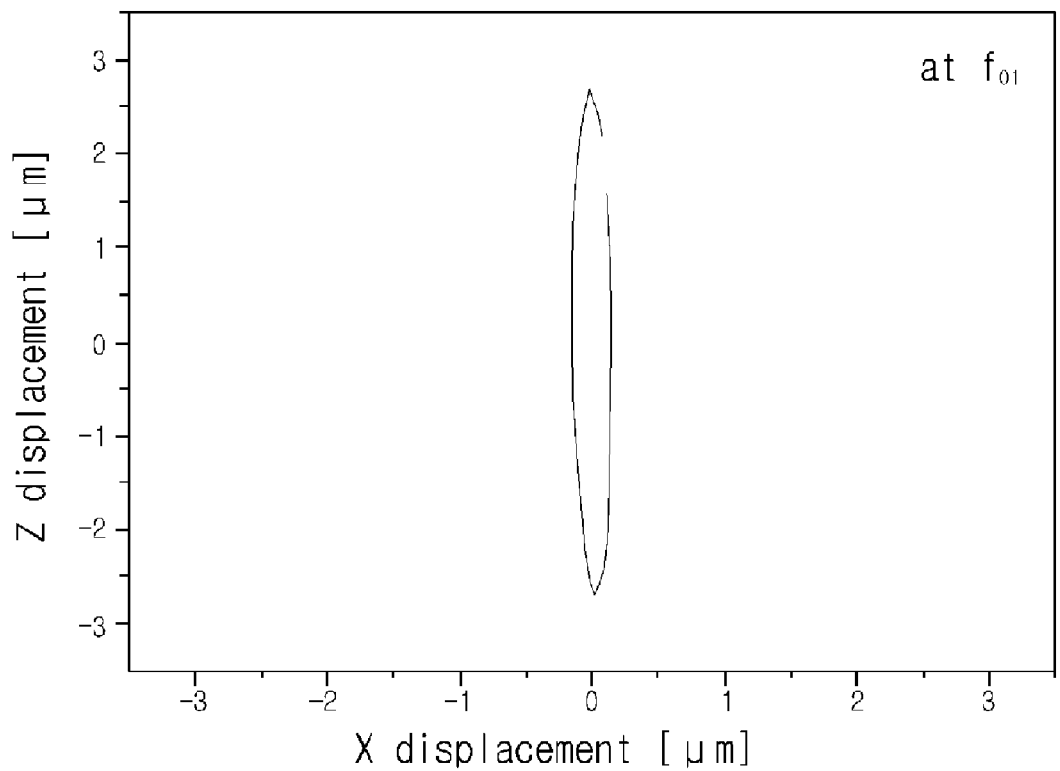
[Fig. 12]
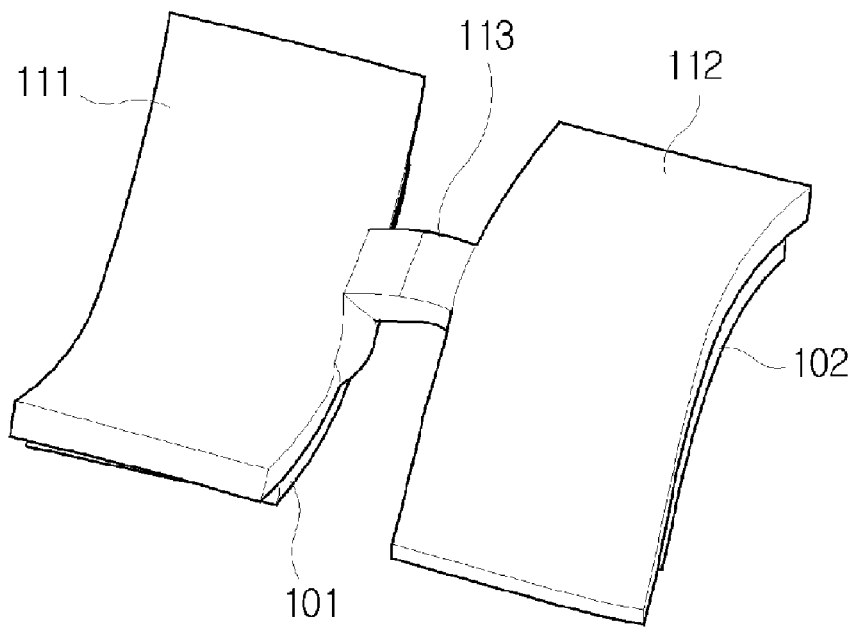

[Fig. 13]
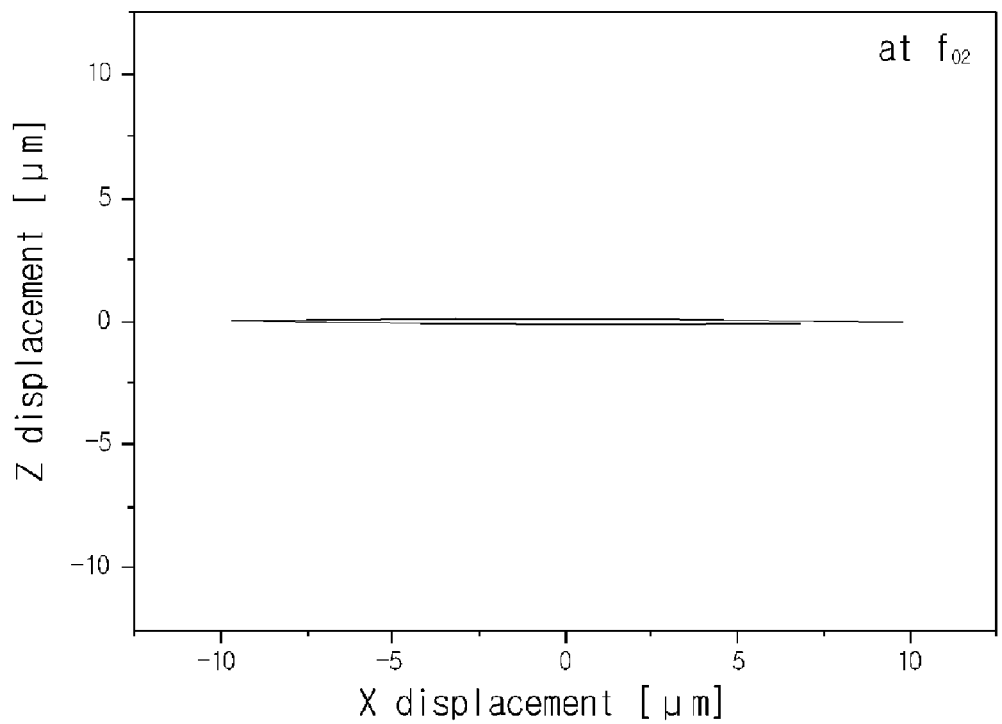
[Fig. 14]
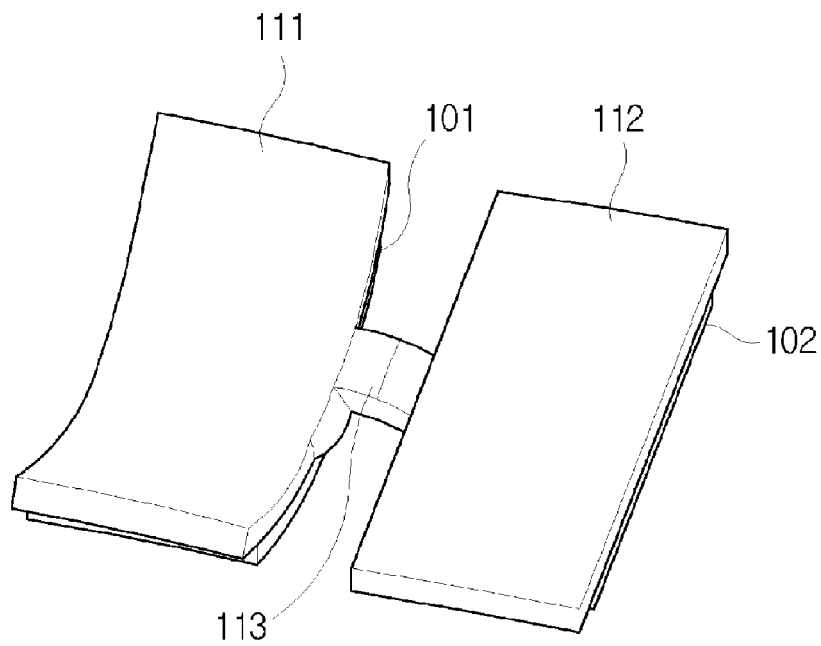

[Fig. 15]
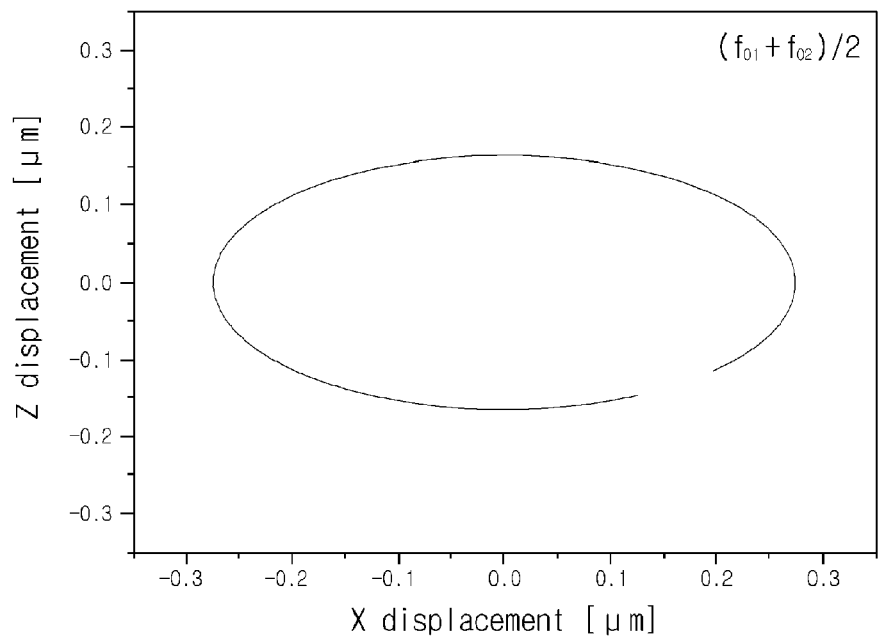
[Fig. 16]
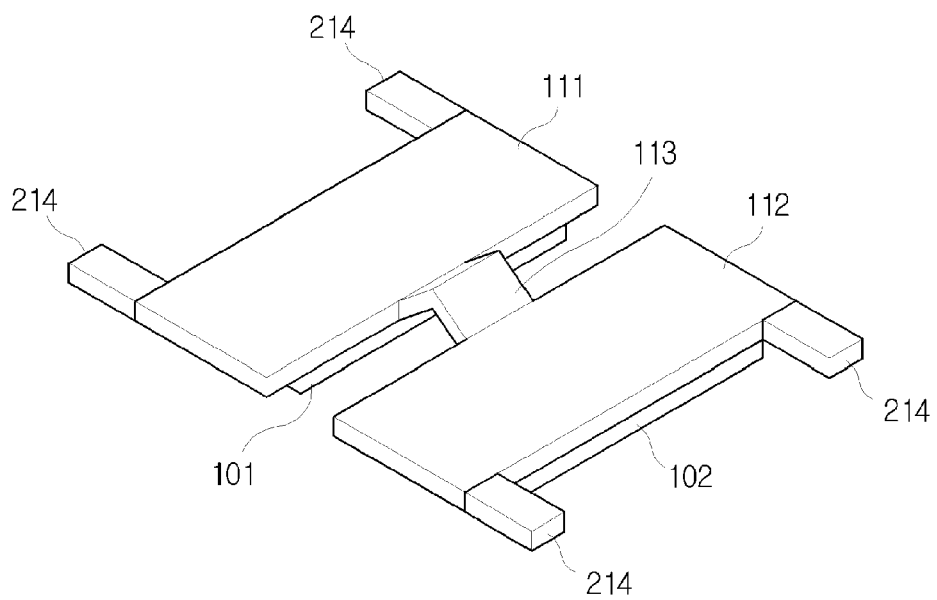

[Fig. 17]
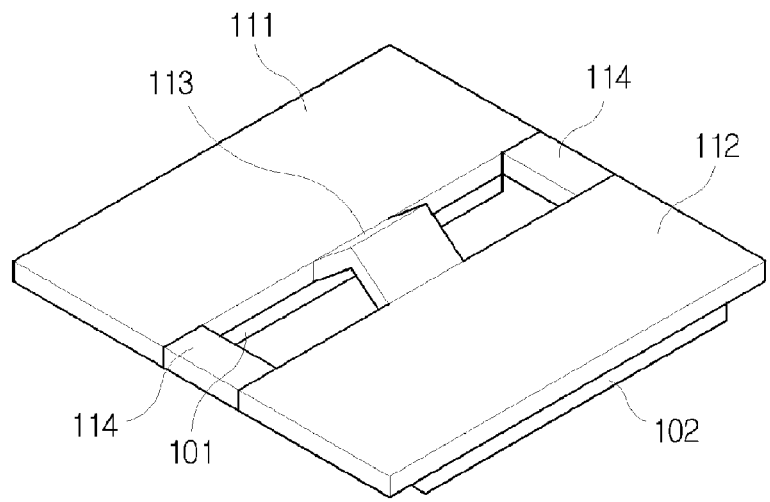
[Fig. 18]
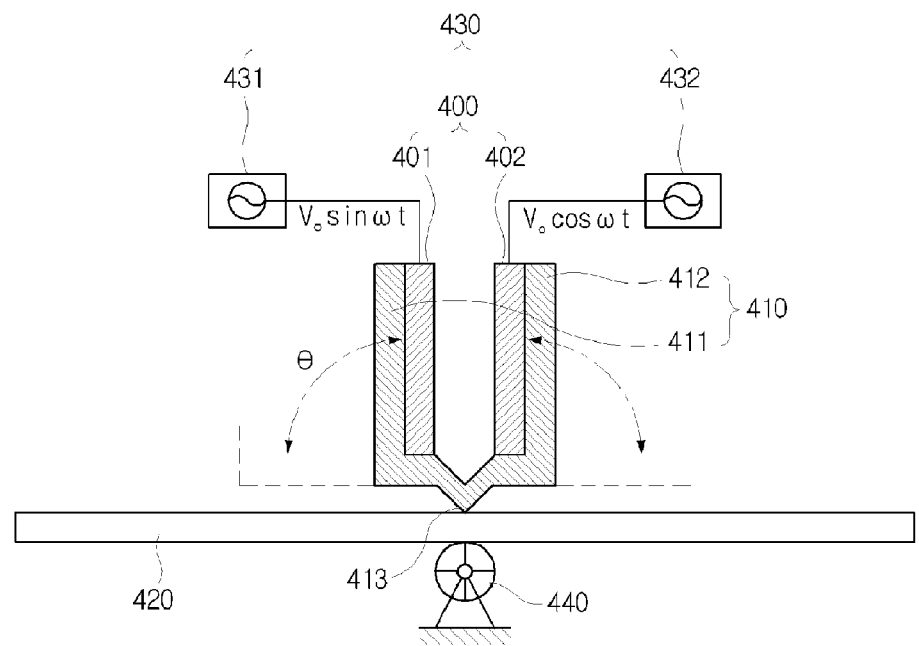

PIEZO ELECTRIC LINEAR MOTOR

TECHNICAL FIELD

The present invention relates to a piezoelectric linear motor, and more particularly to a piezoelectric motor having an actuator with driving portion that can move elliptically while AC voltages are applied to piezoelectric elements with a phase difference for making an effective linear movement of a mover.

BACKGROUND ART

Conventionally, electromagnetic linear motors having cams, links or the like for converting a rotation into a linear movement or solenoid motors were used for obtaining a linear driving force. However, there is a problem with a linear motor, which uses cams or the like for converting rotation into a linear movement since the size is extremely large and the movement accuracy is very low. Further, there is a problem with a solenoid motor in that linear displacement is limited since the solenoid must be disposed around a total linear displacement. Thus, in order to solve these problems, a piezoelectric motor is moved to the front. The piezoelectric motor has a simple structure compared to the electromagnetic linear motor. Further, it can be driven at a low speed. Moreover, its displacement is less limited than the solenoid motor.

Generally, when several sheets of piezoelectric elements (which thin metal sheets are interposed between) are overlapped with each other, a sufficient amount of electricity can be obtained. Mechanical deformation can be converted into an electric signal due to such character of a piezoelectric element. The character has been used in a microphone, record player, etc. for a long time. On the other hand, if a high frequency voltage is applied to a piezoelectric crystallized plate, the plate will expand and contract periodically. In particular, if the frequency of the voltage is matched to a natural frequency of the plate, then it will resonate to thereby oscillate strongly. This is referred to as a reverse piezoelectric effect. Strong and stable mechanical oscillation can be obtained by this reverse piezoelectric effect. The piezoelectric linear motor uses oscillation according to the reverse piezoelectric effect for obtaining a linear driving force.

Further, piezoelectric/electrostriction motors are generally driving sources without any magnets and winding wires. Since a piezoelectric motor is driven at a low speed with a strong driving force without any complex parts for force transfer as a gear, cam and the like. Also, it is not influenced by a magnetic field with simple structure. Since the sound wave produced during an oscillation of the motor is an inaudible ultra-sound wave, it can be driven silently. Further, its displacement can be controlled in an accurate nanometer scale.

The piezoelectric linear motor can be classified into two types. One is a motor driven by a progressive wave produced by the flexural wave. Another is a motor having an actuator driven by a combination of a longitudinal stationary wave and a lateral stationary wave, while the actuator makes a linear displacement with repetitive longitudinal and lateral oscillations. In the former motor driven by the progressive wave, a stator formed from a piezoelectric ceramic with a metallic elastic body attached thereto contacts a mover, while the elastic body attached to the stator produces an oscillating wave for driving the linear motor. The latter motor driven by the stationary waves is driven by the oscillating wave of the piezoelectric body during an application of a voltage. The voltage has a frequency corresponding to the natural frequency of each stator. This motor has a higher efficiency and a much simpler control circuit.

As shown in FIGS. 1 and 2, the piezoelectric element 1 may be deformed while a piezoelectric element 1 is connected to an electric power supply 30 for applying a voltage to a piezoelectric element 1. FIGS. 1 and 2 show the deformations of piezoelectric elements having different polarizing directions. The polarizing direction of a piezoelectric element shown in FIG. 1 is opposite to that of FIG. 2. Here, P represents a polarizing direction and E represents an electric field direction. If the electric field E is applied, then the piezoelectric element 1 will expand or contract. If the polarizing direction of the piezoelectric element 1 matches the electric field, then the piezoelectric element 1 will expand in the z direction and contract in the x direction as 1'. On the other hand, if the polarizing direction of piezoelectric element 1 is opposite to the electric field, then the piezoelectric element 1 will expand in the x direction and contract in the z direction as 1".

As shown in FIGS. 3 and 4, if the piezoelectric element 1 is coupled to a metallic elastic body 10, then the expansion or contraction of the piezoelectric element 1 will bend them, although they have different elasticities. In FIG. 3, the polarizing direction of the piezoelectric element 1 is coincident to the direction of the electric field. Thus, the piezoelectric element 1 and the elastic body 10 are bent to the −z direction. On the other hand, as shown in FIG. 4, the polarizing direction of the piezoelectric element 1 is opposite to the direction of the electric field. Thus, the piezoelectric element 1 and the elastic body 10 are bent to the z direction. FIGS. 1 to 4 illustrate a lateral oscillation. However, a longitudinal oscillation can be illustrated in the same way.

As shown in FIGS. 5 and 6, a conventional piezoelectric linear motor comprises a piezoelectric element 1, an elastic body 10 as a stator coupled to the piezoelectric element 1, a power supply 30 applying AC voltage to the piezoelectric element 1 and a mover 20. The mover 20 is moved by an oscillation of the elastic body 10.

In the conventional piezoelectric linear motor, a voltage application makes stationary oscillations of the piezoelectric element 1. Its lateral oscillation makes the elastic body 10 repeat hard contact to the mover and becoming loose therefrom. Its longitudinal oscillation makes the elastic body oscillate in an orthogonal direction to the linear movement of the mover 20. That is, as shown in FIG. 5, the elastic body 10 contacts the mover 20 by a lateral oscillation of the piezoelectric element 1, while the elastic body 10 directs as an arrow shown in FIG. 5 by a longitudinal oscillation. Thus, the mover 20 is moved linearly in the direction of the arrow by the movement of the elastic body 10. On the other hand, the elastic body 10 is moved away from the mover 20 by the lateral oscillation, while the elastic body 10 is moved in an opposite direction to the mover movement by the longitudinal oscillation. At this time, the mover 20 may not move. As such, the mover substantially moves in the direction of the arrow shown in FIG. 5 since the combination of the longitudinal oscillation and the lateral oscillation is produced repeatedly.

However, there is a problem with the prior art piezoelectric linear motor in that the contact between the elastic body and the mover causes an extreme abrasion, thereby reducing the durability.

There is a further problem with the prior art piezoelectric linear motor in that the movement of the mover cannot be controlled accurately since a transmission of the displacement from the elastic body to the mover may be changed by the abrasion.

There is another problem with the prior art piezoelectric linear motor in that right and reverse movements cannot be achieved since there is only one oscillation mode with the combined oscillation of the lateral and longitudinal oscillations in one piezoelectric element.

DISCLOSURE OF INVENTION

Technical Problem

Accordingly, in order to solve the above problems, the object of the present invention is to provide a piezoelectric linear motor performing an accurate linear movement with a low abrasion by an elliptic displacement of a central protrusion between two elastic bodies.

Further, it is another object of the present invention to provide a piezoelectric linear motor, which can be driven reversely with ease by reversing a phase difference of voltages applied to the piezoelectric elements.

Technical Solution

The present invention provides a piezoelectric linear motor comprising the following: a piezoelectric substrate having a first piezoelectric element and a second piezoelectric element, wherein AC voltages are applied to the first and second piezoelectric elements with a phase difference; a metallic elastic body having first and second elastic bodies coupled to the piezoelectric elements and a central protrusion protruded at the central portion connecting the first and second elastic body, the central protrusion oscillating elliptically during an application of the voltage; and a mover contacting the central protrusion of the metallic elastic body for a linear movement, wherein the movement of the mover is orthogonal to the central protrusion. The phase difference of the voltages applied to the first and second piezoelectric elements must be reversal for a reversal movement of the mover.

The piezoelectric substrate and the first and second elastic bodies can be placed parallel to the mover. The motor can further comprise an actuator supporting segments protruding outward at both ends of the metallic elastic bodies for fixing to a case. Alternatively, the motor further comprises an actuator supporting segments connecting the first and second elastic bodies to each other.

Also, the first and second piezoelectric elements can be inclined to the movement direction of the mover with a predetermined angle at the central protrusion. The metallic elastic body is coupled to the first and second piezoelectric elements. Further, the metallic elastic body is folded with the same angle to the first and second piezoelectric elements.

Also, the phase difference between the voltages applied to the first and second piezoelectric elements can be 90°. At this time, the AC voltage $V_0 \sin \omega t$ is applied to the first piezoelectric element, while the AC voltage $V_0 \cos \omega t$ is applied to the second piezoelectric element. That is, a phase of the voltage applied to the first piezoelectric element precedes 90° to a phase of the voltage applied to the second piezoelectric element for right driving. On the other hand, the phase of the voltage applied to the first piezoelectric element must be late as 90° to the phase of the voltage applied to the second piezoelectric element for reversal driving.

Moreover, a frequency of the voltage applied from the first and second power sources is chosen between two resonant frequencies of the actuator. At this time, the frequency of the voltage applied from the first and second power sources can be chosen between the first and second resonant frequencies of the actuator.

Further, it is preferable that the motor additionally comprises a shock absorbing support next to the mover for guiding and supporting the mover, wherein the shock absorbing support absorbs the shocks from the contact between the mover and the central protrusion.

Advantageous Effects

The present invention is efficient in that unnecessary abrasions can be reduced since only the central protrusion may contact the mover.

In addition, the present invention is efficient in that the mover can be moved accurately by adjusting the frequency of a voltage for changing a semimajor axis or a semiminor axis of the elliptic displacement. Moreover, the present invention is efficient in that the mover can be moved reversely by reversing the phase difference of the voltage.

In accordance with the present invention, the piezoelectric linear motor has a simple structure. In addition, the metallic elastic body and the piezoelectric elements can be folded with a predetermined angle according to corresponding position and area thereof in the motor. Thus, the present invention is efficient in that the shape of the motor can be modified variously.

BRIEF DESCRIPTION OF THE DRAWINGS

FIG. 1 and FIG. 2 are schematic views showing a deformation of a piezoelectric element while an electric voltage is applied to the piezoelectric element.

FIG. 3 and FIG. 4 are schematic views showing a deformation of the piezoelectric element coupled to an elastic body while an electric voltage is applied to the piezoelectric element.

FIG. 5 is a schematic view showing a prior art piezoelectric linear motor.

FIG. 6 is a schematic view showing an operation of the piezoelectric linear motor shown in FIG. 1.

FIG. 7 is a front view showing a piezoelectric motor in accordance with a first embodiment of the present invention.

FIG. 8 is a perspective view showing an actuator of a piezoelectric linear motor shown in FIG. 7, wherein the actuator is formed with a piezoelectric body substrate and an elastic support segment.

FIG. 9 is a graph showing resonant frequencies of the piezoelectric linear motor actuator.

FIG. 10 is a perspective view showing a deformation of the actuator at the first resonant frequency ($f_{o1}$) in accordance with the first embodiment of the present invention.

FIG. 11 is a graph showing a displacement of the piezoelectric linear motor actuator at the frequency of FIG. 10.

FIG. 12 is a perspective view showing a deformation of the actuator at the second resonant frequency ($f_{o2}$) in accordance with the first embodiment.

FIG. 13 is a graph showing a displacement of the piezoelectric linear motor actuator at the frequency of FIG. 12.

FIG. 14 is a perspective view showing a deformation of the actuator at a frequency between the first resonant frequency ($f_{o1}$) and the second resonant frequency ($f_{o2}$) in accordance with the first embodiment.

FIG. 15 is a graph showing a displacement of the piezoelectric linear motor actuator at the frequency of FIG. 14.

FIG. 16 is a perspective view showing a piezoelectric motor actuator in accordance with the second embodiment of the present invention.

FIG. 17 is a perspective view showing a piezoelectric motor actuator in accordance with the third embodiment of the present invention.

FIG. 18 is a front view showing a piezoelectric motor actuator in accordance with the fourth embodiment of the present invention.

BEST MODE FOR CARRYING OUT THE INVENTION

Hereinafter, the embodiments of the present invention will be described with reference to FIGS. 7 to 18.

In the embodiment shown in FIG. 7, the piezoelectric linear motor comprises the following: a power supply 130 having a first power source 131 and a second power source 132; a piezoelectric substrate 100 having first and second piezoelectric elements 101 and 102, which are applied with the electric voltage from the power sources; a metallic elastic body 110 having first and second elastic bodies 111 and 112 and a central protrusion 113, wherein the first and second elastic bodies 111 and 112 are coupled to the piezoelectric elements, and wherein the central protrusion 113 is disposed between the first and second elastic bodies and protruded orthogonally to the piezoelectric substrates 100 and oscillating with elliptic displacement while the electric voltage is applied to the piezoelectric element from the power supply 130; and a mover 120 contacting the central protrusion 113. Here, the piezoelectric actuator is defined as a coupled body of the piezoelectric substrate 100 and the metallic elastic body 110.

The motor further comprises a shock absorbing support 140 next to the mover 120 for guiding and supporting the mover. The shock absorbing support can absorb shocks from the contact between the mover 120 and the central protrusion 113.

In this embodiment, the piezoelectric substrate 100 (101 and 102) and the first and second elastic bodies 111 and 112 are disposed parallel to the mover 120. The lateral direction is defined as the direction parallel to the mover, while the longitudinal direction is defined as a direction orthogonal thereto.

Voltages applied by the first and second power sources 131 and 132 must have a phase difference for an elliptic oscillation of the central protrusion 113. In this embodiment, the AC voltage $V=V_0 \sin \omega t$ is applied from the first power source 131, while the AC voltage $V=V_0 \cos \omega t$ is applied from the second power source 132. That is, there is a phase difference of 90° between the applied voltages from the first and second power sources 131 and 132.

If the AC voltage $V=V_0 \cos \omega t$ is applied from the first power source 131 while the AC voltage $V=V_0 \sin \omega t$ is applied from the second power source 132, then the central protrusion 113 will oscillate reversely with the same elliptic displacement. Thus, the mover 120 can move reversely with ease.

As shown in FIG. 9, the piezoelectric actuator of the present invention has several resonant frequencies. However, two resonant frequencies are shown in FIG. 9.

FIG. 10 is a result of deformation of the piezoelectric actuator at each frequency simulated by the FEM program ATILA.

As shown in FIG. 10, referring to a simulated result at the first resonant frequency ($f_{o1}$), the first piezoelectric element 101 and the first elastic body 111 oscillate similarly to the second piezoelectric element 102 and the second elastic body 112, while the phase difference of voltages applied to each piezoelectric elements is 90°. FIG. 11 shows the displacement of the central protrusion 113 of the piezoelectric actuator of FIG. 10. As shown in FIG. 11, the longitudinal displacement is quite large. However, the lateral displacement is quite small. Thus, the displacement is not relevant for the linear lateral movement of the mover.

FIG. 12 is a result of deformation of the piezoelectric actuator at each frequency simulated by the FEM program ATILA. As shown in FIG. 12, referring to a simulated result at the second resonant frequency ($f_{o2}$), the first piezoelectric element 101 and the first elastic body 111 oscillate with a phase difference of 180° to the second piezoelectric element 102 and the second elastic body 112, while the phase difference of voltages applied to each piezoelectric element is 90°. FIG. 13 shows the displacement of the central protrusion 113 of the piezoelectric actuator. As shown in FIG. 13, the lateral displacement of the central protrusion 113 is quite large, although the longitudinal displacement is quite small. Thus, the displacement is not relevant for making a sufficient amount of friction force between the central protrusion and the mover for a linear lateral movement of the mover.

FIG. 14 is a result of deformation of the piezoelectric actuator at each frequency simulated by the FEM program ATILA. FIG. 14 shows a simulated result at a frequency $((f_{o1}+f_{o2})/2)$ at a middle of the first resonant frequency ($f_{o1}$) and the second resonant frequency ($f_{o2}$). At this frequency, the first piezoelectric element 101 and the first elastic body 111 oscillate with a phase difference of 90° to the second piezoelectric element 102 and the second elastic body 112, while the phase difference of the voltages of 90° is applied to each piezoelectric element. As shown in FIG. 15, the displacement of the central protrusion 113 is an ellipse having a lateral semimajor axis. The lateral displacement of the oscillation is long enough for the movement of the mover 120. Further, the longitudinal displacement of the oscillation is also long enough for making a sufficient amount of friction force between the mover 120 and the central protrusion 113. That is, it is preferable that the frequency at the middle area between two adjacent resonant frequencies must be chosen. Also, the closer frequency to the higher resonant frequency can make a larger lateral displacement. On the other hand, the closer frequency to a lower resonant frequency can make a larger longitudinal displacement. The frequency of the voltages in this embodiment is chosen at the middle frequency between the first and second resonant frequencies to obtain an elliptic displacement large enough laterally and large enough longitudinally.

As shown in FIGS. 16 and 17, the actuators of the second and third embodiments essentially comprise the same components as the first embodiment. They also comprise fixing portions for supporting the actuator. That is, a supporting means for fixing the displacement of the central protrusion at origin with zero amplitude is further provided.

In the second embodiment of the present invention, actuator supporting segments 114 are protruded outward at both ends of each elastic body for fixing the actuator to a structure as a case.

In the third embodiment, the actuator can be fixed by the supporting segment 214 that connects the elastic bodies with each other.

As shown in FIG. 18, in the fourth embodiment of the present invention, a piezoelectric linear motor comprises the following: a power supply 430 having a first power source 431 and a second power source 432; a piezoelectric substrate 430 having a first piezoelectric element 401 and a second piezoelectric element 402 applied with electric voltages from the power sources, wherein the first piezoelectric element 401 and the second piezoelectric element 402 are inclined to the lateral direction at a predetermined angle θ; a metallic elastic body 410 having a first elastic body 411, a second elastic body 412 and a central protrusion 413 protruding longitudinally from a central portion of the first and second elastic bodies, wherein the first and second elastic bodies are coupled to the corresponding piezoelectric elements, and wherein the central protrusion oscillate while voltages are applied to the piezoelectric elements; a mover 420 brought into contact with the central protrusion 413 of the metallic elastic body 410.

The motor further comprises a shock absorbing support 440 next to the mover 420 for guiding and supporting the mover. The shock absorbing support can absorb shocks from the contact between the mover 420 and the central protrusion 413.

This is for changing the position and the size relatively to the complete linear motor by considering the piezoelectric linear motor as a part of production.

The above-mentioned embodiments are linear motors, wherein the displacement directs laterally. However, a longitudinal linear motor can be designed by forming the central protrusion 113 laterally and disposing the mover 120 longitudinally.

Hereinafter, the function and effect of the present invention will be described.

If AC voltage with a phase difference is applied to two piezoelectric elements that have the same shape and material, then each piezoelectric element will oscillate with a phase difference. However, if the piezoelectric elements are connected to each other, then the central portion connecting therebetween will essentially oscillate with an elliptic displacement. That is, the central protrusion 113 should oscillate with the elliptic displacement. The mover 120 is moved laterally by its elliptic displacement of the central protrusion 113, while the central protrusion 113 contacts the mover 120.

However, as mentioned above, at the resonant frequency, the displacements of the central protrusion 113 are one sided, as laterally or longitudinally. Thus, it is preferable that the frequency of the applied voltage is not at the resonant frequency since the displacement at the resonant frequency seems to be not an ellipse but rather a line. The frequency making an elliptic displacement of the central protrusion with a lateral semimajor axis must be chosen for the lateral movement. The frequency making an elliptic displacement having a longitudinal semimajor axis must be chosen for the longitudinal linear movement.

Further, the movement speed of the mover 120 can be controlled by the frequency, which can control the lateral displacement of the central protrusion.

Also, as the fourth embodiment, even if the piezoelectric substrate 400 is folded at 90 about the lateral direction, the central protrusion will oscillate elliptically as described with respect to the first embodiment. That is, when the piezoelectric motor is placed on a thin wide area, the actuator can be designed properly as the first embodiment. However, when the piezoelectric motor is placed on a narrow area, the actuator should be designed as the fourth embodiment.

While the present invention has been described and illustrated with respect to a preferred embodiment of the invention, it will be apparent to those skilled in the art that variations and modifications are possible without deviating from the broad principles and teachings of the present invention, which should be limited solely by the scope of the claims appended hereto.

The invention claimed is:
1. A piezoelectric linear motor, comprising:
a piezoelectric substrate, comprising a first piezoelectric element and a second piezoelectric element to which AC voltages are applied with a phase difference;
a metallic elastic body, comprising:
first and second elastic bodies coupled respectively to the first and second piezoelectric elements, the first and second elastic bodies being disposed independently of each other; and
a central protrusion protruding at a central portion of the metallic elastic body and oscillating elliptically during application of the voltages, the central protrusion being disposed in between and connecting the first and second elastic bodies to form the metallic elastic body; and
a mover contacting the central protrusion of the metallic elastic body for a linear movement that is orthogonal to the central protrusion.

2. The piezoelectric linear motor of claim 1, wherein the phase difference of the voltages applied to the first and second piezoelectric elements is reversed for a reversal movement of the mover.

3. The piezoelectric linear motor of claim 2, wherein a phase of the voltage applied to the first piezoelectric element precedes 90° to a phase of the voltage applied to the second piezoelectric element for a right driving, and
wherein the phase of the voltage applied to the first piezoelectric element is late as 90° to the phase of the voltage applied to the second piezoelectric element for a reversal driving.

4. The piezoelectric linear motor of claim 1, wherein the piezoelectric substrate and an entirety of the first and second elastic bodies are placed parallel to the mover.

5. The piezoelectric linear motor of claim 4, further comprising:
actuator supporting segments protruding outward at ends of the metallic elastic body, the actuator supporting segments being coplanar to the metallic elastic body and parallel to each other.

6. The piezoelectric linear motor of claim 4, further comprising:
actuator supporting segments connecting and being coplanar with the first and second elastic bodies, the actuator supporting segments being parallel to each other, the central protrusion being disposed between the actuator supporting segments.

7. The piezoelectric linear motor of claim 1, wherein the first and second piezoelectric elements are inclined to a movement direction of the mover in a predetermined angle from the central protrusion,
wherein the metallic elastic body is coupled to the first and second piezoelectric elements, and
wherein the metallic elastic body is folded with the predetermined angle to the first and second piezoelectric elements.

8. The piezoelectric linear motor of claim 7, wherein the first and second piezoelectric elements and the metallic elastic body are folded orthogonally to the mover.

9. The piezoelectric linear motor of claim 1, wherein a frequency of the voltage applied from first and second power sources is chosen between first and second resonant frequencies of an actuator.

10. The piezoelectric linear motor of claim 9, wherein the frequency of the voltage applied from the first and second power sources is chosen at a middle frequency of the first and second resonant frequencies of the actuator.

11. The piezoelectric linear motor of claim 2, wherein a frequency of the voltage applied from first and second power sources is chosen between first and second resonant frequencies of an actuator.

12. The piezoelectric linear motor of claim 11, wherein the frequency of the voltage applied from the first and second power sources is chosen at a middle frequency of the first and second resonant frequencies of the actuator.

13. The piezoelectric linear motor of claim 3, wherein a frequency of the voltage applied from first and second power sources is chosen between first and second resonant frequencies of an actuator.

14. The piezoelectric linear motor of claim 13, wherein the frequency of the voltage applied from the first and second power sources is chosen at a middle frequency of the first and second resonant frequencies of the actuator.

15. The piezoelectric linear motor of claim 1, further comprising:
    a shock absorbing support formed adjacent to the mover for guiding and supporting the mover, the shock absorbing support absorbing shocks from the contact between the mover and the central protrusion.

16. The piezoelectric linear motor of claim 1, wherein edges of the first and second elastic bodies that are connected to the central protrusion are substantially coplanar to respective edges of the first and second piezoelectric elements.

17. The piezoelectric linear motor of claim 1, further comprising:
    actuator supporting segments protruding away from the central protrusion at opposite ends of the metallic elastic body, the actuator supporting segments being coplanar to the metallic elastic body and parallel to each other.

18. A piezoelectric linear motor, comprising:
    a piezoelectric substrate, comprising a first piezoelectric element and a second piezoelectric element;
    a metallic elastic body, comprising:
        first and second elastic bodies coupled respectively to the first and second piezoelectric elements, the first and second elastic bodies being disposed independently of each other; and
        a central protrusion protruded at a central portion of the metallic elastic body, the central protrusion being disposed in between and connecting the first and second elastic bodies to form the metallic elastic body; and
    a mover contacting the central protrusion of the metallic elastic body for a linear movement, which is orthogonal to the central protrusion.

19. The piezoelectric linear motor of claim 18, wherein the piezoelectric substrate and an entirety of the first and second elastic bodies are placed parallel to the mover.

20. The piezoelectric linear motor of claim 19, wherein a separation of the first and second elastic bodies is substantially equal to a respective separation of the first and second piezoelectric elements.

* * * * *